United States Patent
Lev et al.

(10) Patent No.: US 9,373,873 B2
(45) Date of Patent: Jun. 21, 2016

(54) COOLING SYSTEM FOR AUTOMOTIVE BATTERY

(75) Inventors: Leonid C. Lev, West Bloomfield, MI (US); Nikolay Kondratyev, West Bloomfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 578 days.

(21) Appl. No.: 13/396,655

(22) Filed: Feb. 15, 2012

(65) Prior Publication Data

US 2013/0209856 A1  Aug. 15, 2013

(51) Int. Cl.
| | |
|---|---|
| H01M 10/42 | (2006.01) |
| H01M 10/50 | (2006.01) |
| H01M 6/50 | (2006.01) |
| H01M 10/613 | (2014.01) |
| H01M 10/625 | (2014.01) |
| H01M 10/6569 | (2014.01) |
| H01M 10/6551 | (2014.01) |
| H01M 10/6565 | (2014.01) |

(52) U.S. Cl.
CPC .......... *H01M 10/613* (2015.04); *H01M 10/625* (2015.04); *H01M 10/6551* (2015.04); *H01M 10/6565* (2015.04); *H01M 10/6569* (2015.04)

(58) Field of Classification Search
USPC .............................. 429/120; 29/623.1–623.5
See application file for complete search history.

(56) References Cited

U.S. PATENT DOCUMENTS

| | | | |
|---|---|---|---|
| 6,361,687 B1 | 3/2002 | Ford et al. | |
| 6,482,542 B1* | 11/2002 | Takaki et al. | 429/120 |
| 7,591,484 B2 | 9/2009 | McBee et al. | |
| 7,658,420 B2 | 2/2010 | Harger et al. | |
| 2009/0258289 A1* | 10/2009 | Weber et al. | 429/120 |
| 2010/0009248 A1* | 1/2010 | Fuhrmann | H01M 10/613 429/120 |
| 2011/0070475 A1* | 3/2011 | Thomas et al. | 429/120 |
| 2011/0076540 A1 | 3/2011 | Ronning et al. | |
| 2011/0183176 A1 | 7/2011 | Schwab et al. | |
| 2011/0206964 A1* | 8/2011 | Odumodu et al. | 429/120 |
| 2011/0212355 A1 | 9/2011 | Essinger et al. | |
| 2011/0269008 A1* | 11/2011 | Houchin-Miller et al. | 429/120 |
| 2011/0293982 A1 | 12/2011 | Martz et al. | |
| 2011/0300428 A1* | 12/2011 | Sohn | 429/120 |
| 2012/0021270 A1 | 1/2012 | Kumar et al. | |
| 2012/0045683 A1* | 2/2012 | Gadawski | 429/120 |
| 2012/0045684 A1* | 2/2012 | Gadawski | 429/120 |
| 2012/0070711 A1* | 3/2012 | Souki | H01M 10/6566 429/120 |
| 2012/0107663 A1* | 5/2012 | Burgers et al. | 429/120 |

* cited by examiner

*Primary Examiner* — Basia Ridley
*Assistant Examiner* — Caitlin Wilmot
(74) *Attorney, Agent, or Firm* — Fraser Clemens Martin & Miller LLC; William A. Ziehler

(57) ABSTRACT

Method and apparatus for thermal management of a battery cell or a battery assembly including a plurality of battery cells. One or more fins are in thermal contact with one or more battery cells. A fluid is caused to flow from a high pressure side of a plenum fluidly coupled to each fin, through a cavity in each fin, and back to a low pressure side of the plenum. The fins are fluidly coupled to the plenum using flexible connections that can accommodate movement of the fins with respect to the plenum.

20 Claims, 3 Drawing Sheets

COOLING SYSTEM FOR AUTOMOTIVE BATTERY

FIELD OF THE INVENTION

The present technology relates to a battery cell or battery assembly having a heat exchange system comprising a plenum with one or more fluidly coupled cooling fins in thermal contact with one or more battery cells.

BACKGROUND OF THE INVENTION

This section provides background information related to the present disclosure which is not necessarily prior art.

Electrical systems within vehicles, such as hybrid, electric, and fuel cell vehicles, have advanced in complexity and power usage. Such vehicles can use an electric motor in combination with a battery power source. The battery can power the vehicle alone or can work in conjunction with another power source, such as an internal combustion engine.

High power output and large capacity batteries can be used as the battery power source. A number of battery cells can be connected in series or parallel with each other so as to construct a larger battery assembly. The battery cells can be packaged together with various mechanical and electrical couplings between the battery cells to form the assembly. One type of battery assembly includes prismatic batteries or pouch-shaped batteries placed in a stacked relationship to reduce space and overall size of the assembly. For example, lithium-ion battery cells can be formed as prismatic battery cells that utilize a pouch filled with a liquid or a polymer electrolyte. Such prismatic battery cells can exhibit changes in thickness during charging/discharging and over a lifetime of the cells. For example, each battery cell pouch can swell or contract, effecting a change in one or more dimensions of the battery cells and battery assembly.

Heat can be generated by the battery cells during a charging process and a discharging process. Heat that accumulates in the battery assembly can adversely affect the battery cells. Accordingly, a cooling system can be provided to maintain a desirable operating temperature. Such cooling systems can include some manner of heat sink or fluid heat exchanger where air is blown over the battery cells and/or a liquid coolant is used. For example, a cooling system can include one or more cooling plates or fins sandwiched between individual battery cells within the battery assembly. In some cases, the cooling system can have channels through which a fluid (e.g., coolant) flows in a heat transfer relationship with the battery cells.

The temperature of a battery cell in a battery assembly is an important factor related to the serviceable life and performance of the battery. As battery assemblies can have many battery cells stacked together, temperature can be different at different locations in the assembly. Moreover, individual battery cells can vary in performance and hence operating temperature due to variations in manufacture. Thus, there is a need to maintain a battery cell and multiple battery cells within a battery assembly at proper temperatures.

SUMMARY OF THE INVENTION

The present technology includes systems, processes, and articles of manufacture that include battery cells and battery assemblies such as prismatic lithium-ion battery cells and battery assemblies that have heat exchange systems including a plenum and one or more fluidly coupled fins in thermal contact with one or more of the battery cells.

In some embodiments, a battery assembly is provided that comprises a battery cell and a heat exchange system. The heat exchange system includes a fin, a high pressure source of fluid, a low pressure source of fluid, a first connection, and a second connection. The fin has a first surface and a cavity where the first surface is in thermal contact with the battery cell and the cavity includes an inlet and an outlet. The first connection fluidly couples the high pressure source of fluid to the inlet. The second connection fluidly couples the low pressure source of fluid to the outlet. The first connection and the second connection can be flexible.

In other embodiments, a battery assembly is provided that comprises a first battery cell, a second battery cell, and a heat exchange system. The heat exchange system includes a first fin, a plenum, a first connection, a second connection, a second fin, a third connection, and a fourth connection. The first fin includes a first surface and a cavity where the first surface is in thermal contact with the first battery cell and the cavity includes an inlet and an outlet. The plenum includes a high pressure side and a low pressure side. The first connection fluidly couples the high pressure side to the inlet of the cavity of the first fin. The second connection fluidly couples the low pressure side to the outlet of the cavity of the first fin. The second fin includes a first surface and a cavity where the first surface is in thermal contact with the second battery cell and the cavity includes an inlet and an outlet. The third connection fluidly couples the high pressure side to the inlet of the cavity of the second fin. The fourth connection fluidly couples the low pressure side to the outlet of the cavity of the second fin. In certain aspects, the first fin can further include a second surface having at least one protuberance that contacts the second battery cell. One or more of the first, second, third, and fourth connections can also be flexible.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF EXEMPLARY EMBODIMENTS OF THE INVENTION

Figure 1:
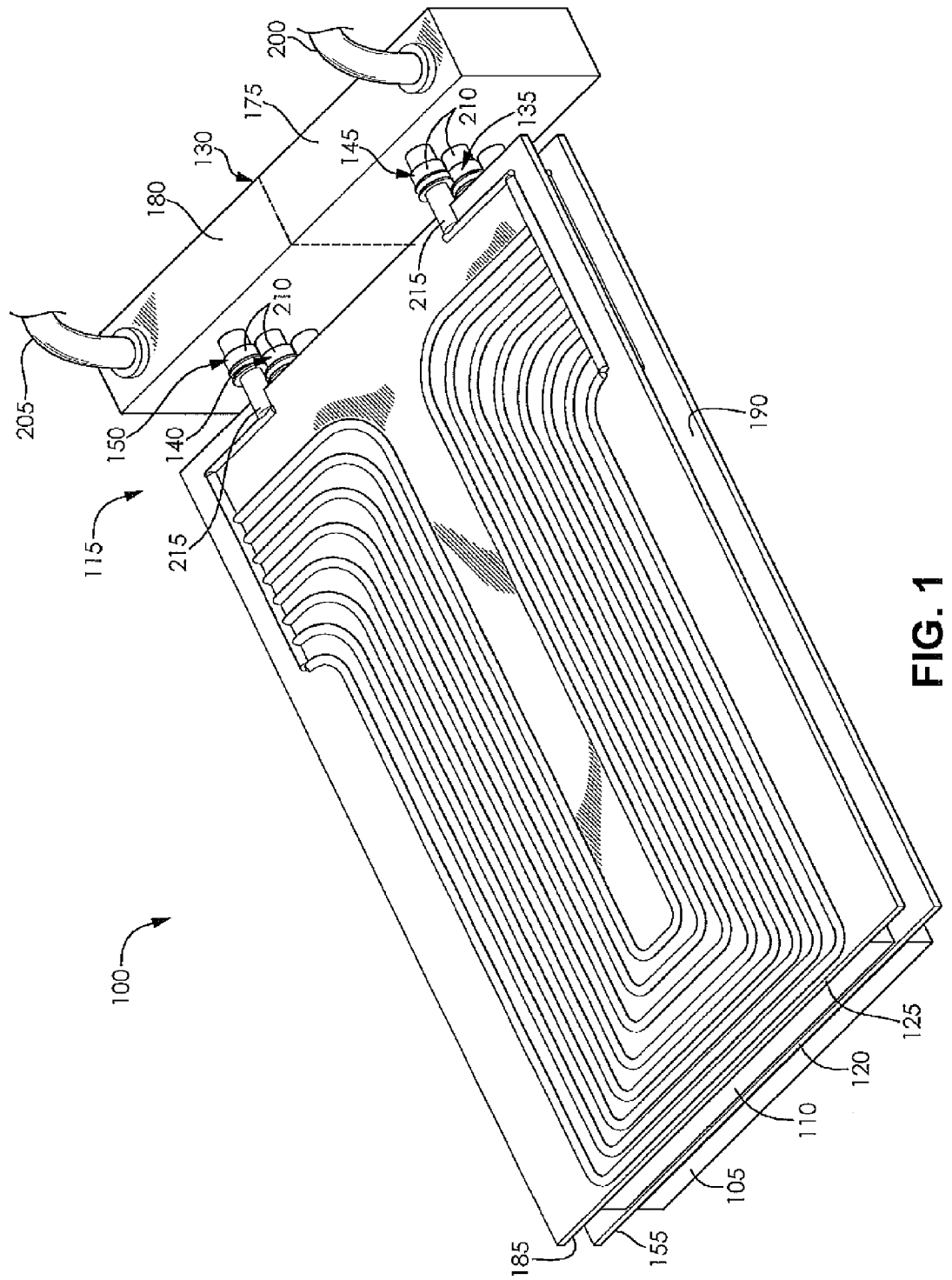
FIG. 1 is a perspective view of an embodiment of battery assembly including two battery cells and a heat exchange system.
Figure 2:
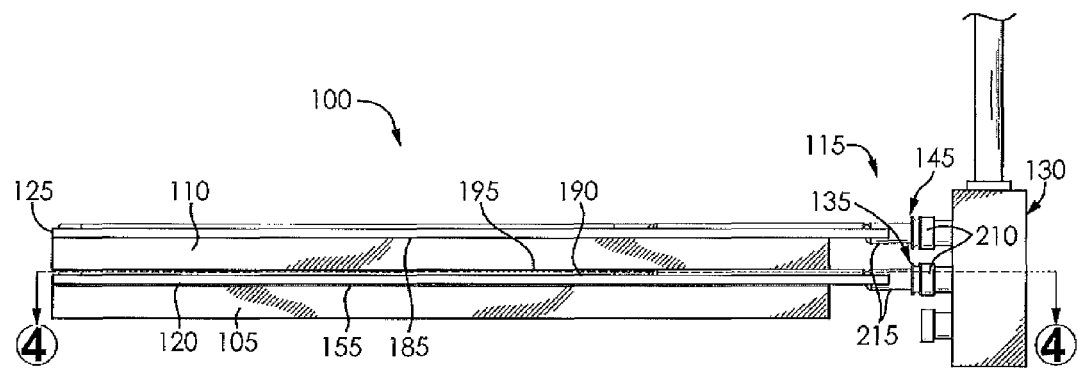
FIG. 2 is a side elevational view of the battery assembly of FIG. 1.
Figure 3:
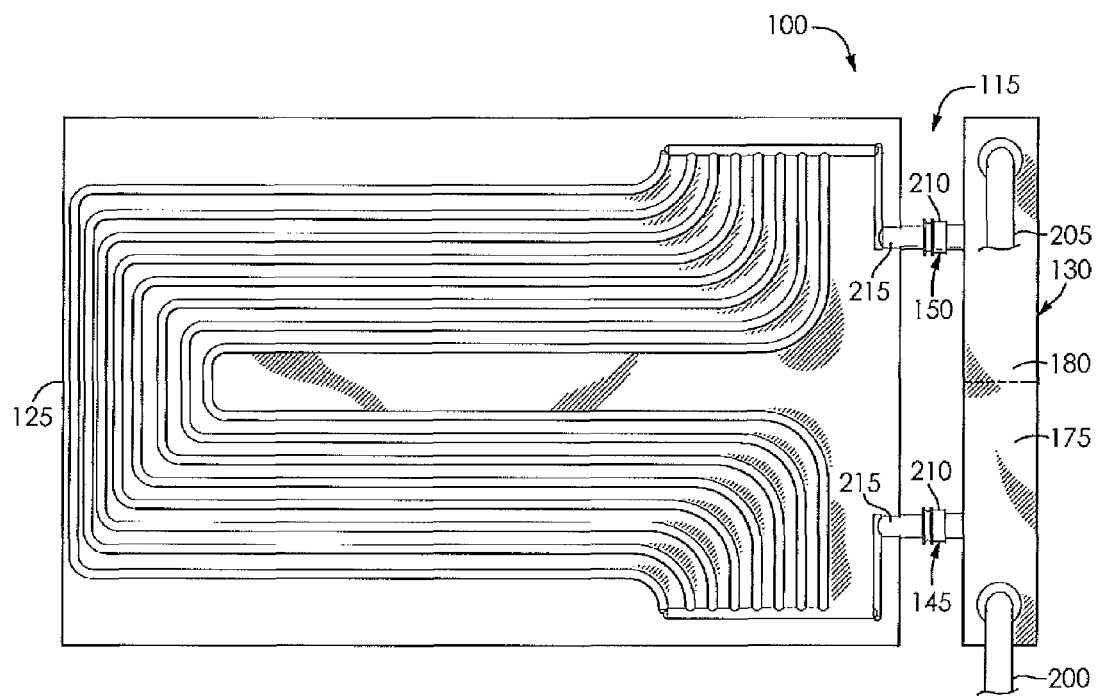
FIG. 3 is a top plan view of the battery assembly of FIG. 1.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments where possible.

The present technology relates to a heat exchange system for a battery cell and a heat exchange system for a battery assembly comprising a plurality of battery cells. The battery cells can be prismatic batteries or pouch-shaped batteries arranged in a stacked relationship; e.g., a battery assembly of prismatic lithium-ion battery cells. The heat exchange system accommodates dimensional changes in the battery cell or battery assembly where one or more battery cells may swell or contract during charging and discharging, for example. Improvements in coupling the cooling system to the battery cell or battery assembly are also provided by the battery cooling system. In particular, one or more cooling fins disposed on or between one or more battery cells can each be fitted with flexible elements and couplings that connect to supply and return reservoirs for circulating a cooling fluid in the heat exchange system.

In comparison, some heat exchange systems or cooling systems can only operate when the entire battery assembly is assembled. For example, several cooling fins may be connected in series or dependent on each other by sharing one or more coolant lines, where such connections need to be in place prior to operating the cooling system. In some cases, the design of the battery cooling system may require careful assembly of a large number of repeating frames disposed about the battery cells and cooling fins prior to coupling the cooling fins to the remainder of the cooling system. Furthermore, cooling fins can be sealed about a perimeter or periphery of the fin, and a misalignment in assembly may lead to contact or pinching of one or more cooling fins or the seal of the fin when disposed within the frames.

The present technology addresses these issues by providing a heat exchange system that can cool or heat each battery cell separately, that does not require assembly of large number of repeating frames, and that does not face misalignment issues. In some embodiments, a battery cell comprising a heat exchange system is provided where the heat exchange system includes a fin, a plenum, and two connections. The fin can have a first surface and a cavity where the first surface can be in thermal contact with the battery cell. The cavity can include an inlet and an outlet. The plenum can include a high pressure side and a low pressure side. One of the connections can be a first connection that fluidly couples the high pressure side of the plenum to the inlet of the cavity of the fin. The other of the connections can be a second connection that fluidly couples the low pressure side of the plenum to the outlet of the cavity of the fin. One or both of the first and second connections can be flexible.

The connections can compensate for misalignments and relative displacement and movement of the cooling fin with respect to the plenum of the heat exchange system. Displacement and movement of the cooling fin can be due changes in a thickness of one or more battery cells during charging or discharging and over a lifetime of the battery cells. In particular, a battery cell pouch can swell or contract, effecting a change in one or more dimensions of the battery cell and/or the battery assembly and hence change a position of one or more fins in relation to each other and/or the plenum. As the fin moves, the flexible first connection and the flexible second connection can bend, move, stretch, or compress to accommodate the movement of the fin with respect to the plenum.

In a similar fashion, the fin can be a flexible fin and can change in at least one dimension based on a pressure of a fluid within the cavity of the fin. For example, the fin may expand in thickness as a pressure of a fluid contained therein is increased and the fin may contract in thickness as the pressure of the fluid contained therein is decreased. Thus, one or more battery cells and one or more cooling fins may independently change in one or more dimensions and change their respective positions in relation to the plenum.

The cooling fin can include additional aspects. The fin can have a second surface comprising at least one protuberance. For example, the first surface of the fin can be in thermal contact with a first battery cell and the second surface can include one or more protuberances to minimize thermal contact with a second battery cell on the opposite side of the fin. The protuberance can include a raised pattern including isolated or connected features of various shapes; e.g., a series of ribs. In this manner, the protuberances can contact whatever the second surface of the fin faces. The contact surface area of the protuberances can be less than a surface area of the entire second surface. Accordingly, thermal contact with the second surface can be reduced. Where the second surface having the protuberance contacts a second battery cell, the thermal contact with the second battery cell can be less than the thermal contact of the first surface with the first battery cell. This allows a particular fin to predominantly exchange heat with a particular battery cell via the first surface. The protuberance can also impart rigidity to the fin and can mitigate the flexibility of the fin in one or more dimensions. Protuberances can also be configured to accommodate swelling and contracting of the fin when a fluid pressure within the cavity changes. In some embodiments, the protuberance can form a portion of a flow field. For example, one or more protuberances can comprise channels in the flow field.

The cavity of the fin provides a space for movement of a fluid from the inlet of the cavity to the outlet of the cavity. Where the fin is substantially planar, the cavity can be a space disposed between a substantially planar first surface and a substantially planar second surface, where the periphery of the first and second surfaces are sealed with the exception of the inlet and the outlet of the cavity. The cavity can also include a flow field having one or more partitions forming one or more channels that are configured to direct fluid between the inlet and the outlet. Channels of the flow field can be arranged in various ways such as a serpentine pattern. All or part of the pattern of the flow field can protrude from the fin and form protuberance(s) on the second surface of the fin.

The inlet and the outlet of the cavity of the fin can vary in spacing, where a distance between the outlet and inlet can be different in different fins. The inlet and outlet can be positioned on the same side of the fin or on different sides of the fin depending on the configuration of the fin and the configuration of the plenum. When the inlet and outlet are on the same side of the fin or exit the fin in the same direction, substantially parallel connections can fluidly couple the inlet and outlet to the plenum. For example, a plurality of substantially planar and substantially parallel battery cells can be arranged in a stacked relationship with a plurality of substantially planar and substantially parallel fins, where the stacked relationship comprises alternating battery cells and fins. The fins in the stacked relationship can have inlets and outlets in a common direction where each is coupled to the plenum via a connection; i.e., inlets fluidly coupled to the high pressure side and outlets fluidly coupled to the low pressure side.

The plenum can include various aspects. The high pressure side of the plenum can further include a fluid supply line and the low pressure side of the plenum further include a fluid return line. One of the fluid supply line and the fluid return line can be fluidly coupled to a pump. In this manner, fluid having a high pressure can be supplied through the fluid supply line into the high pressure side of the plenum. The fluid can then flow into the cavity of the fin through the first connection fluidly coupled to the inlet of the cavity. Fluid can flow out of the cavity of the fin through the second connection fluidly coupled to the outlet of the cavity and into the low pressure side of the plenum. From the low pressure side, the fluid can flow from the low pressure side out the fluid return line. Both the high pressure side and the low pressure side of the plenum can include a plurality of connections that are fluidly coupled to inlets and outlets of a plurality of fins. As such, the high pressure side of the plenum can provide a flow of fluid to the inlets of a plurality of fins and the low pressure side of the plenum can receive a flow of fluid from the outlets of the plurality of fins. In some cases, the high pressure side of the plenum can provide a flow of fluid having the same pressure to each fin fluidly coupled thereto.

The connections can be flexible in that at least a portion of the connection can bend or flex while maintaining a fluid coupling between the fin and plenum. For example, the fin can bend, twist, or move in a horizontal or vertical direction relative to the plenum where a portion of the connection includes a length of flexible tubing. A distance between the fin and the plenum can also change as a portion of the connection can be compressed or stretched. In certain embodiments, the tubing can be plastic tubing or rubber tubing.

Various embodiments of the connections can include couplings known as quick-connect fittings, also referred to as quick-disconnect or quick-release couplings. Such quick-connect fittings can be configured to snap together or interlock in various ways. The quick-connect fittings can include two separate portions that are coupled together, such as a male portion and a female portion. The quick-connect fitting can be configured with a locking means to militate against uncoupling of the quick-connect fitting to maintain a fluid tight seal when a pressurized flow of fluid is passing therethrough. The quick-connect fitting can further include a self-sealing valve in one or both portions that prevents fluid from exiting the fitting portions when disconnected from each other. Examples of quick-connect fittings include U.S. Pat. No. 7,658,420 to Harger et al.; U.S. Pat. No. 7,591,484 to McBee et al., and U.S. Pat. No. 6,361,687 to Ford et al., which are incorporated herein by reference. Commercial examples of quick-connect fittings are available from Quick Fitting Inc. (East Providence, R.I.) and Value Plastics, Inc. (Fort Collins, Colo.). The connection can include a flexible portion (e.g., plastic or rubber tubing) on one or both sides of the coupling (e.g., quick-connect fitting).

In some embodiments, a battery assembly is provided that comprises a first battery cell, a second battery cell, and a heat exchange system. The heat exchange system can include a first fin, a second fin, a plenum, and first, second, third, and fourth connections. The first fin can include a first surface and a cavity where the first surface can be in thermal contact with the first battery cell and the cavity can include an inlet and an outlet. Likewise, the second fin can include a first surface and a cavity where the first surface can be in thermal contact with the second battery cell and the cavity can include an inlet and an outlet. The plenum can include a high pressure side and a low pressure side. The first connection can fluidly couple the high pressure side to the inlet of the cavity of the first fin. The second connection can fluidly couple the low pressure side to the outlet of the cavity of the first fin. The third connection can fluidly couple the high pressure side to the inlet of the cavity of the second fin. The fourth connection can fluidly couple the low pressure side to the outlet of the cavity of the second fin.

The heat exchange system can be used to cycle a fluid therethrough, wherein the fluid can include a gas or liquid. For example, the fluid can include a liquid coolant or antifreeze. Examples of liquid coolants include aqueous solutions of one or more polyalkylene glycols.

The present technology provides several advantages, including simplification of manufacturing processes. System robustness for a battery cell or battery assembly employing the heat exchange system can be optimized. Likewise, the system can be frameless or minimize frame alignment parameters when used with one or more frames disposed about the battery cells and fins.

EXAMPLE

Figure 4:
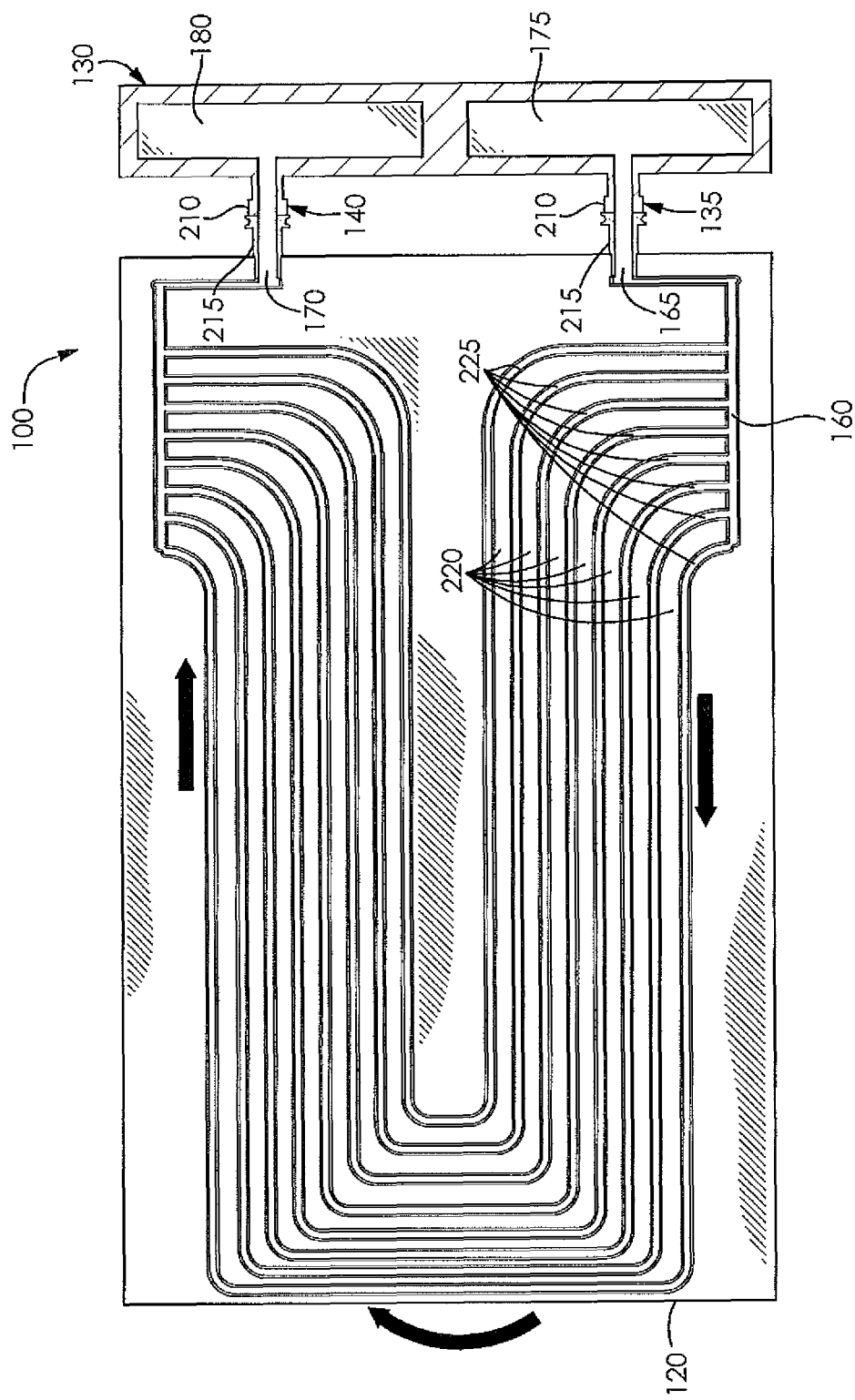
FIG. 4 is a cross-sectional view taken along line 4-4 shown in FIG. 2.

With reference to FIGS. 1-4, an embodiment of a battery assembly 100 including two battery cells 105, 110 and a heat exchange system 115 is shown. The heat exchange system 115 includes a first fin 120, a second fin 125, a plenum 130, a first connection 135, a second connection 140, a third connection 145, and a fourth connection 150. The first fin 120 includes a first surface 155 and a cavity 160. The first surface 155 of the first fin 120 is in thermal contact with the first battery cell 105. The cavity 160 of the first fin 120 includes an inlet 165 and an outlet 170. The plenum 130 includes a high pressure side or source of fluid 175 and a low pressure side or source of fluid 180. The first flexible connection 135 fluidly couples the high pressure side 175 of the plenum 130 to the inlet 165 of the cavity 160 of the first fin 120. The second flexible connection 140 fluidly couples the low pressure side 180 of the plenum 130 to the outlet 170 of the cavity 160 of the first fin 120. The second fin 125 includes a first surface 185 and a cavity similar to 160 as shown for the first fin 120. The first surface 185 of the second fin 125 is in thermal contact with the second battery cell 110. The cavity of the second fin 120 includes an inlet and an outlet similar to the inlet 165 and the outlet 170 as shown for the first fin 120. The third connection 145 fluidly couples the high pressure side 175 of the plenum 130 to the inlet of the cavity of the second fin 125. The fourth flexible connection 150 fluidly couples the low pressure side 180 of the plenum 130 to the outlet of the cavity of the second fin 125. The first fin 120 further includes a second surface 190 having at least one protuberance 195. The protuberance 195 contacts the second battery cell 110 to minimize a surface area of the second surface 190 of the first fin 120 that is in contact with the second battery cell 110. The protuberance 195 is formed by channels 225 of a flow field where the cavity 160 of the first fin 120 includes a flow field formed by partitions 220 separating a plurality of channels 225 (eight are shown) configured to direct fluid between the inlet 165 and the outlet 170. The block arrows in FIG. 4 depict the general direction of fluid flow through the channels 225. The high pressure side 175 of the plenum 130 includes a fluid supply line 200 and the low pressure side 180 of the plenum 130 includes a fluid return line 205. One of the fluid supply line 200 and the fluid return line 205 can be fluidly coupled to a pump (not shown). Each of the first, second, third, and fourth connections 135, 140, 145, 150 can be flexible and each can include a quick connect fitting 210 having a self-sealing valve and a length of flexible tubing 215.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A battery assembly comprising:
a first battery cell;
a second battery cell; and
a heat exchange system, the heat exchange system comprising:
a fin having a first surface, a second surface, and a cavity, the first surface in thermal contact with the first battery cell, the second surface having at least one protuberance directly contacting the second battery cell, the cavity having an inlet and an outlet, the cavity comprising a flow field having at least one partition configured to direct fluid between the inlet and the outlet, and the at least one protuberance comprising a portion of the flow field;
a high pressure source of fluid;
a low pressure source of fluid;
a plenum including a high pressure side separated from a low pressure side, the high pressure side including the high pressure source of fluid and a fluid supply line, the low pressure side including the low pressure source of fluid and a fluid return line;
a first connection fluidly coupling the high pressure source of fluid to the inlet; and
a second connection fluidly coupling the low pressure source of fluid to the outlet, wherein at least one of the first connection and the second connection is flexible.

2. The battery assembly of claim 1, wherein the battery cell is a prismatic lithium-ion battery cell.

3. The battery assembly of claim 1, wherein the fin is flexible.

4. The battery assembly of claim 1, wherein the fin can change in at least one dimension based on a pressure of a fluid within the cavity.

5. The battery assembly of claim 1, wherein at least one of the first connection and the second connection includes a quick-connect fitting.

6. The battery assembly of claim 5, wherein the quick-connect fitting includes a self-sealing valve.

7. The battery assembly of claim 1, wherein the first connection and the second connection each include a length of flexible tube.

8. The battery assembly of claim 7, wherein the length of flexible tube is a plastic tube or a rubber tube.

9. A battery assembly comprising:
a first battery cell;
a second battery cell; and
a heat exchange system, the heat exchange system comprising:
a first fin having a first surface, a second surface, and a cavity, the first surface in thermal contact with the first battery cell, the second surface having at least one protuberance directly contacting the second battery cell, the cavity having an inlet and an outlet, the cavity comprising a flow field having at least one partition configured to direct fluid between the inlet and the outlet, and the at least one protuberance comprising a portion of the flow field;
a plenum comprising a high pressure side separated from a low pressure side;
a first connection fluidly coupling the high pressure side to the inlet of the cavity of the first fin;
a second connection fluidly coupling the low pressure side to the outlet of the cavity of the first fin;
a second fin having a first surface and a cavity, the first surface in thermal contact with the second battery cell, the cavity having an inlet and an outlet;
a third connection fluidly coupling the high pressure side to the inlet of the cavity of the second fin; and
a fourth connection fluidly coupling the low pressure side to the outlet of the cavity of the second fin.

10. The battery assembly of claim 9, wherein at least one of the first fin and the second fin is flexible or at least one of the first fin and the second fin can change in at least one dimension based on a pressure of a fluid within the cavity.

11. The battery assembly of claim 9, wherein the cavity of the second fin further comprises a flow field including at least one partition configured to direct fluid between the inlet and the outlet.

12. The battery assembly of claim 9, wherein the high pressure side of the plenum further includes a fluid supply line and the low pressure side of the plenum further includes a fluid return line.

13. The battery assembly of claim 9, wherein at least one of the first connection, the second connection, the third connection, and the fourth connection is flexible.

14. The battery assembly of claim 9, wherein at least one of the first connection, the second connection, the third connection, and the fourth connection includes a quick connect fitting having a self-sealing valve.

15. The battery assembly of claim 9, wherein each of the first connection, the second connection, the third connection, and the fourth connection includes a length of flexible tube and a quick connect fitting having a self-sealing valve.

16. The battery assembly of claim 9, wherein no portion of the first connection is coextensive with the third connection and no portion of the second connection is coextensive with the fourth connection.

17. A battery assembly comprising:
a first battery cell;
a second battery cell; and
a heat exchange system, the heat exchange system comprising:
a first fin having a first surface, a second surface, and a cavity, the first surface in thermal contact with the first battery cell, the second surface having at least one protuberance directly contacting the second battery cell, the cavity having an inlet and an outlet, the cavity comprising a flow field including at least one partition configured to direct fluid between the inlet and the outlet, the at least one protuberance comprising a portion of the flow field, where a contact surface area between the first surface and the first battery cell is greater than a contact surface area between the second surface and the second battery cell, thereby allowing the first fin to predominantly exchange heat with the first battery cell via the first surface;
a plenum comprising a high pressure side separated from a low pressure side;
a first connection fluidly coupling the high pressure side to the inlet of the cavity of the first fin;
a second connection fluidly coupling the low pressure side to the outlet of the cavity of the first fin;
a second fin having a first surface and a cavity, the first surface in thermal contact with the second battery cell, the cavity having an inlet and an outlet;
a third connection fluidly coupling the high pressure side to the inlet of the cavity of the second fin; and a fourth connection fluidly coupling the low pressure side to the outlet of the cavity of the second fin.

18. The battery assembly of claim 1, wherein the first surface faces the first battery cell, the first surface directly contacts the first battery cell, the first surface is in thermal contact only with the first battery cell, the second surface faces the second battery cell, and the at least one protuberance directly contacts only the second battery cell.

19. The battery assembly of claim 9, wherein the first surface faces the first battery cell, the first surface directly contacts the first battery cell, the first surface is in thermal contact only with the first battery cell, the second surface faces the second battery cell, and the at least one protuberance directly contacts only the second battery cell.

20. The battery assembly of claim 17, wherein the first surface faces the first battery cell, the first surface directly contacts the first battery cell, the first surface is in thermal contact only with the first battery cell, the second surface faces the second battery cell, and the at least one protuberance directly contacts only the second battery cell.

* * * * *